(12) United States Patent
Chakraborti et al.

(10) Patent No.: US 11,797,820 B2
(45) Date of Patent: Oct. 24, 2023

(54) DATA AUGMENTED TRAINING OF REINFORCEMENT LEARNING SOFTWARE AGENT

(71) Applicant: International Business Machines Corporation, Armonk, NY (US)

(72) Inventors: Tathagata Chakraborti, Cambridge, MA (US); Kartik Talamadupula, Port Chester, NY (US); Kshitij Fadnis, Astoria, NY (US); Biplav Srivastava, Rye, NY (US); Murray S. Campbell, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 16/704,395

(22) Filed: Dec. 5, 2019

(65) Prior Publication Data

US 2021/0174240 A1    Jun. 10, 2021

(51) Int. Cl.
| | |
|---|---|
| G06N 3/006 | (2023.01) |
| G06N 20/00 | (2019.01) |
| G06N 5/02 | (2023.01) |
| G06F 16/2457 | (2019.01) |
| G06F 18/214 | (2023.01) |

(52) U.S. Cl.
CPC ....... G06N 3/006 (2013.01); G06F 16/24578 (2019.01); G06F 18/214 (2023.01); G06N 5/02 (2013.01); G06N 20/00 (2019.01)

(58) Field of Classification Search
None
See application file for complete search history.

(56) References Cited

U.S. PATENT DOCUMENTS

| | | | |
|---|---|---|---|
| 8,056,129 | B2 | 11/2011 | Gusler et al. |
| 9,665,831 | B2 | 5/2017 | Gaucher et al. |
| 9,942,228 | B2 | 4/2018 | Hauser |

(Continued)

FOREIGN PATENT DOCUMENTS

| | | |
|---|---|---|
| CN | 108984257 A | 12/2018 |
| CN | 109033277 A | 12/2018 |
| CN | 110447026 A | 11/2019 |

OTHER PUBLICATIONS

Serban IV, Sankar C, Germain M, Zhang S, Lin Z, Subramanian S, Kim T, Pieper M, Chandar S, Ke NR, Rajeshwar S. A deep reinforcement learning chatbot. arXiv preprint arXiv:1709.02349. Sep. 7, 2017. (Year: 2017).*

(Continued)

*Primary Examiner* — Vincent Gonzales
(74) *Attorney, Agent, or Firm* — Edell, Shapiro & Finnan, LLC

(57) ABSTRACT

Techniques are provided for reinforcement learning software agents enhanced by external data. A reinforcement learning model supporting the software agent may be trained based on information obtained from one or more knowledge stores, such as online forums. The trained reinforcement learning model may be tested in an environment with limited connectivity to an external environment to meet performance criteria. The reinforcement learning software agent may be deployed with the tested and trained reinforcement learning model within an environment to autonomously perform actions to process requests.

20 Claims, 12 Drawing Sheets

(56) References Cited

U.S. PATENT DOCUMENTS

| | | |
|---|---|---|
| 10,015,178 B2 | 7/2018 | Schulman et al. |
| 10,366,166 B2 | 7/2019 | Yu et al. |
| 10,397,262 B2 | 8/2019 | Karabchevsky et al. |
| 10,419,452 B2 | 9/2019 | Schulman et al. |
| 10,419,479 B2 | 9/2019 | Gopalakrishna |
| 10,957,314 B2 | 3/2021 | Hall et al. |
| 11,501,191 B2 | 11/2022 | Shaikh et al. |
| 2006/0190579 A1 | 8/2006 | Rachniowski et al. |
| 2014/0006012 A1 | 1/2014 | Zhou et al. |
| 2014/0214404 A1 | 7/2014 | Kalia et al. |
| 2014/0280253 A1 | 9/2014 | Clark et al. |
| 2016/0048514 A1 | 2/2016 | Allen et al. |
| 2017/0213132 A1 | 7/2017 | Hammond et al. |
| 2018/0276553 A1 | 9/2018 | Redkar et al. |
| 2018/0302300 A1 | 10/2018 | Moeller-Bertram et al. |
| 2018/0319014 A1 | 11/2018 | Dukatz et al. |
| 2019/0122409 A1 | 4/2019 | Meadows et al. |
| 2019/0132451 A1 | 5/2019 | Kannan |
| 2020/0065697 A1 | 2/2020 | Watson et al. |
| 2020/0106789 A1 | 4/2020 | Boros et al. |
| 2020/0143114 A1 | 5/2020 | Dua et al. |
| 2021/0173682 A1 | 6/2021 | Chakraborti et al. |

OTHER PUBLICATIONS

Ilievski V, Musat C, Hossmann A, Baeriswyl M. Goal-oriented chatbot dialog management bootstrapping with transfer learning. arXiv preprint arXiv:1802.00500. Feb. 1, 2018. (Year: 2018).*

Kuznetsov VA, Mochalov VA, Mochalova AV. Ontological-semantic text analysis and the question answering system using data from ontology. In2016 18th International Conference on Advanced Communication Technology (ICACT) Jan. 31, 2016 (pp. 651-658). IEEE. (Year: 2016).*

Wikipedia.org page for Sandbox, archive.org capture from Jul. 3, 2018, available at https://web.archive.org/web/20180803222109/https://en.wikipedia.org/wiki/Sandbox_(software_development). PDF, 2 pages. (Year: 2018).*

International Search Report and Written Opinion in corresponding International Application No. PCT/IB2020/061230, dated Mar. 9, 2021, 9 pages.

M. Helmert, "The Fast Downward Planning System", Journal of Artificial Intelligence Research 26 (2006) 191-246, Jul. 2006, 56 pages.

O. Etzioni, et al., "A Softbot-Based Interface to the Internet", Communications of the ACM 37, No. 7, Jul. 1994, 6 pages.

O. Etzioni, et al., "OS Agents: Using AI Techniques in the Operating System Environment", Technical Report 93-04-04, Apr. 12, 1993, UW-CSE-93-04-04, University of Washington, 16 pages.

O. Etzioni, et al., "Building Softbots for UNIX", AAAI Technical Report SS-94-03, University of Washington, 1994, 8 pages (circulated in 1992).

N. Blaylock, "The Linux Plan Corpus: Documentation", Aug. 2010, Institute for Human and Machine Cognition, http://www.cs.rochester.edu/research/cisd/resources/linux-plan/, 16 pages.

D. Tecuci, et al., "A Generic Memory Module for Events", vol. 68, No. 09, Aug. 2007, 6 pages.

N. Blaylock, "Towards Tractable Agent-based Dialogue", PhD Thesis, University of Rochester, Department of Computer Science, Aug. 2005, 193 pages.

S.R.K. Branavan, et al., "Reinforcement Learning for Mapping Instructions to Actions", ACL '09: Proceedings of the Joint Conference of the 47th Annual Meeting of the ACL and the 4th International Joint Conference on Natural anguage Processing of the AFNLP; vol. 1, Aug. 2009, 10 pages.

T.A. Han, et al., "Corpus-Based Incremental Intention Recognition via Bayesian Network Model Construction", ICAPS "Goal, Activity and Plan Recognition" workshop, Freiburg, Germany, Jun. 12, 2011, 23 pages.

R.S. Sutton, et al., "Reinforcement Learning", An Introduction, A Bradford Book, The MIT Press, Cambridge Massachusetts, London, England, 1998, pp. 1-100.

R.S. Sutton, et al., "Reinforcement Learning", An Introduction, A Bradford Book, The MIT Press, Cambridge Massachusetts, London, England, 1998, pp. 101-200.

R.S. Sutton, et al., "Reinforcement Learning", An Introduction, A Bradford Book, The MIT Press, Cambridge Massachusetts, London, England, 1998, pp. 201-331.

A. Fern, et al., "A Decision-Theoretic Model of Assistance", Journal of Artificial Intelligence Research 50 (2014), Submitted Oct. 2013, Published May 2014, 34 pages.

W. Bradley Knox, et al., "Combining Manual Feedback with Subsequent MDP Reward Signals for Reinforcement Learning", Proc. of 9th Int. Conf. on Autonomous Agents and Multiagent Systems (AAMAS 2010), van der Hoek, Kaminka, Lespérance, Luck and Sen (eds.), May 10-14, 2010, Toronto, Canada, 8 pages.

M. Taylor, et al., "Transfer Learning for Reinforcement Learning Domains: A Survey", Journal of Machine Learning Research 10 (2009) 1633-1685, Submitted Jun. 2008, Revised May 2009, Published Jul. 2009, 53 pages.

C. Dann et al., "Policy Certificates: Towards Accountable Reinforcement Learning", arXiv:1811.03056v3 [cs.LG] May 27, 2019, Proceedings of the 36th International Conference on Machine Learning, Long Beach, California, PMLR 97, 2019, 42 pages.

T. Chakraborti, et al., "UbuntuWorld 1.0 LTS—A Platform for Automated Problem Solving & Troubleshooting in the Ubuntu OS", arXiv:1609.08524v2 [cs.AI], Aug. 12, 2017, 7 pages.

José Alberto Rodrigues Pereira Sardinha, et al., "Engineering Machine Learning Techniques into Multi-Agent Systems", PUC-RioInf. MCC12/04, May 2004, 27 pages.

A. Dethise, et al., Conference Paper, "Cracking open the black box: What observations can tell us about reinforcement earning agents", http://hdl.handle.net/10754/658663, ACM Press, Aug. 14, 2019, 9 pages.

Disclosed Anonymously, "Training Question-Answering System with the User Ratings", ip.com, IPCOM000258153D, Apr. 12, 2019, 3 pages.

Disclosed Anonymously, "Method and System for Providing a Dynamic Sequence of Questions and Actions in Virtual Agents", ip.com, IPCOM000259139D, Jul. 15, 2019, 4 pages.

Disclosed Anonymously, "Method and System for Providing Continuous Learning to Asset Reuse Manager (ARM) to Train Virtual Agent (VA)", ip.com, IPCOM000257613D, Feb. 23, 2019, 3 pages.

S. Holland, et al., "Direct Combination", Papers, CHI 99 May 15-20, 1999, 8 pages.

List of IBM Patents or Patent Applications Treated as Related, Dec. 5, 2019, 1 page.

* cited by examiner

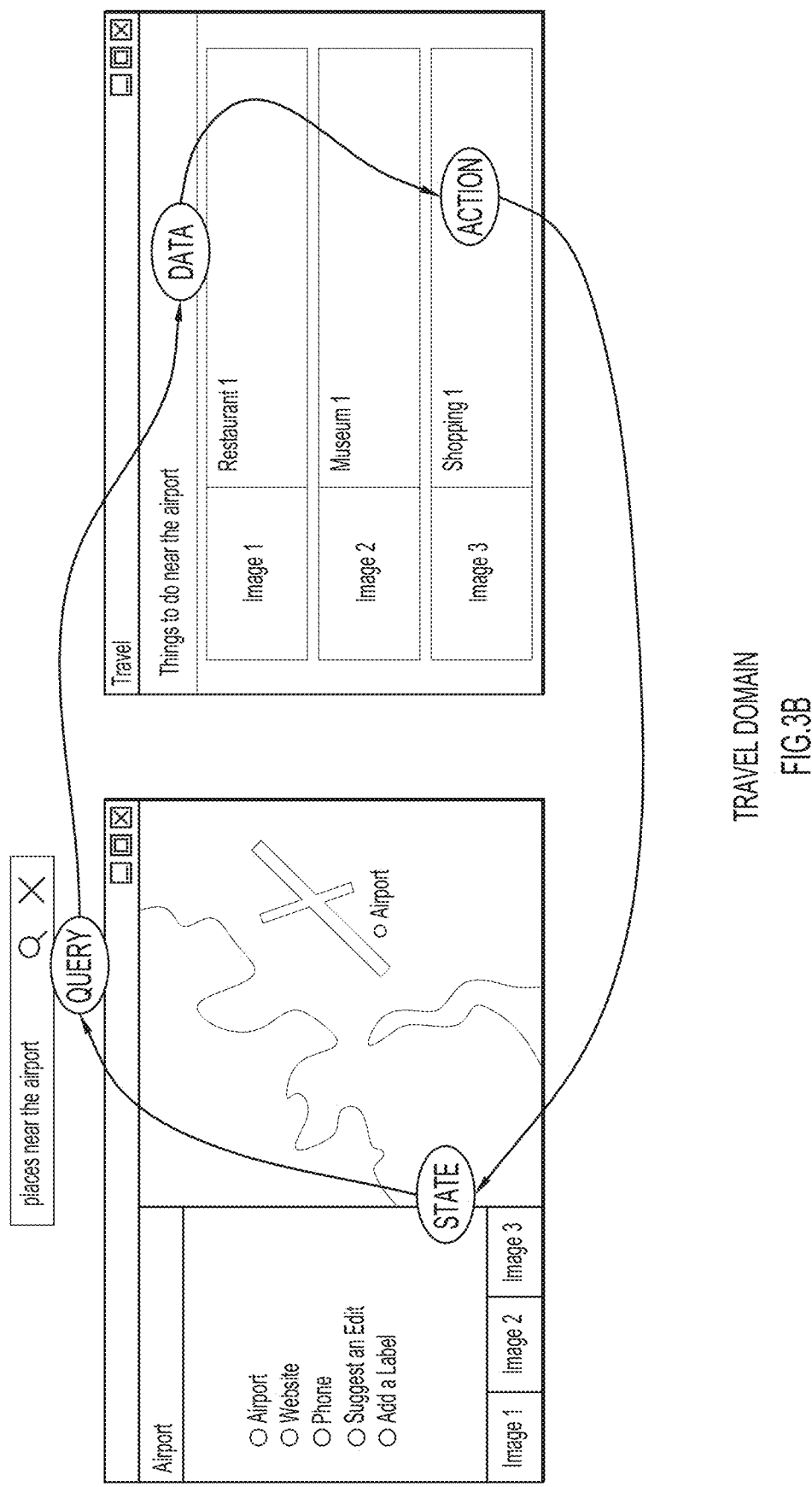

DATA AUGMENTED TRAINING OF REINFORCEMENT LEARNING SOFTWARE AGENT

BACKGROUND

1. Technical Field

Present invention embodiments relate to reinforcement learning software agents, and in particular, to training a reinforcement learning model supporting the reinforcement learning software agent based on information obtained from one or more knowledge stores, and testing the trained reinforcement learning model in an environment with limited connectivity to an external environment. The software agent may be deployed with the tested and trained reinforcement learning model.

2. Discussion of the Related Art

Software agents, or decision agents, are deployed in a variety of settings. Examples of software agents include conversational agents or chatbots, online shopping software agents, spam filters, etc. Typical software agents are deployed in dynamic environments. Rather than being programmed to execute a series of tasks, software agents, which may receive input from their current environment, are configured to act autonomously in order to reach a desired goal.

However, software or decision agents, although operating autonomously, may not make optimal decisions. For example, some software agents operate in a seemingly random manner, and do not learn from past decisions. Other software agents may use machine learning techniques (such as reinforcement learning) as part of the decision process, however, these software agents are still limited in performance in complex situations. Accordingly, software agents are often limited in application to simple systems, and traditional reinforcement learning paradigms often fail in complex situations.

SUMMARY

According to embodiments of the present invention, methods, systems, and computer readable media are provided for using data to configure a reinforcement learning model for a reinforcement learning software agent. Access to a knowledge store comprising data regarding a topic for software agent support is received. Information from the knowledge store is used for training a reinforcement learning model that informs the reinforcement learning software agent. The trained reinforcement learning model is tested in a sandbox testing environment, said testing environment having limited connectivity to an external environment. The reinforcement learning software agent is deployed with the tested and trained reinforcement learning model within an environment to autonomously perform actions to process requests. This approach allows improvements in the performance of reinforcement learning software agents in complex environments as well as improvements in training of the reinforcement learning software agent for deployment in complex environments.

In aspects, the information from the knowledge base is in a semi-structured format and includes questions with one or more corresponding answers. Access is provided to a domain simulator to execute actions by the reinforcement learning software agent in the testing environment. Based on this approach, present techniques are compatible with any type of information in semi-structured format and in which a domain simulator is provided.

In other aspects, the knowledge store includes features that are used by the reinforcement learning model to rank the information provided in the knowledge store. This approach allows knowledge from subject matter experts to automatically be processed and accessed, and provided as guidance to a reinforcement learning software agent in a complex environment. In some embodiments, the reinforcement learning model ranks the information in the knowledge store from user preferences. These techniques may be used to customize particular actions to particular users.

In aspects, a query is generated by the reinforcement learning software system. The query is matched to a state in a policy generated by the reinforcement learning model, wherein each state has a corresponding action. The reinforcement learning software agent executes the action returned from the matching policy. In further aspects, a reward may be received by executing the action by the reinforcement learning software agent, when the action reaches a goal or resolves the query. This allows the reinforcement learning model to provide ranked information to the reinforcement learning software agent to accelerate training and to execute actions based on a ranking to reach a desired goal. This approach may lead to performance improvements in the RL software agent in complex environments with high fan out in regards to available actions.

In aspects, a policy generated by the reinforcement learning model is updated at a fixed or dynamic frequency, to include questions and answers added to the knowledge base. This allows the reinforcement learning model to obtain updates and contain current or recent information in knowledge stores.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

FIGS. 3A-3B are illustrations showing example environments for a deployed reinforcement learning software agent in a reinforcement learning system, according to embodiments of the present invention. FIG. 3A corresponds to a computing environment. FIG. 3B corresponds to a travel environment.

DETAILED DESCRIPTION

A reinforcement learning (RL) model supporting RL software agents is trained from information obtained from one or more knowledge stores. A RL model supporting a RL software agent is trained and tested in a setting with limited connectivity to an external environment. The RL software agent may be deployed with the tested and trained RL model. RL software agents may receive positive reinforcement upon completing a series of actions and corresponding state changes that lead to reaching a goal. When reaching the same state at a future point in time, the RL software agent retains memory, and thus, reaches the goal by repeating the learned actions.

Figure 1A:
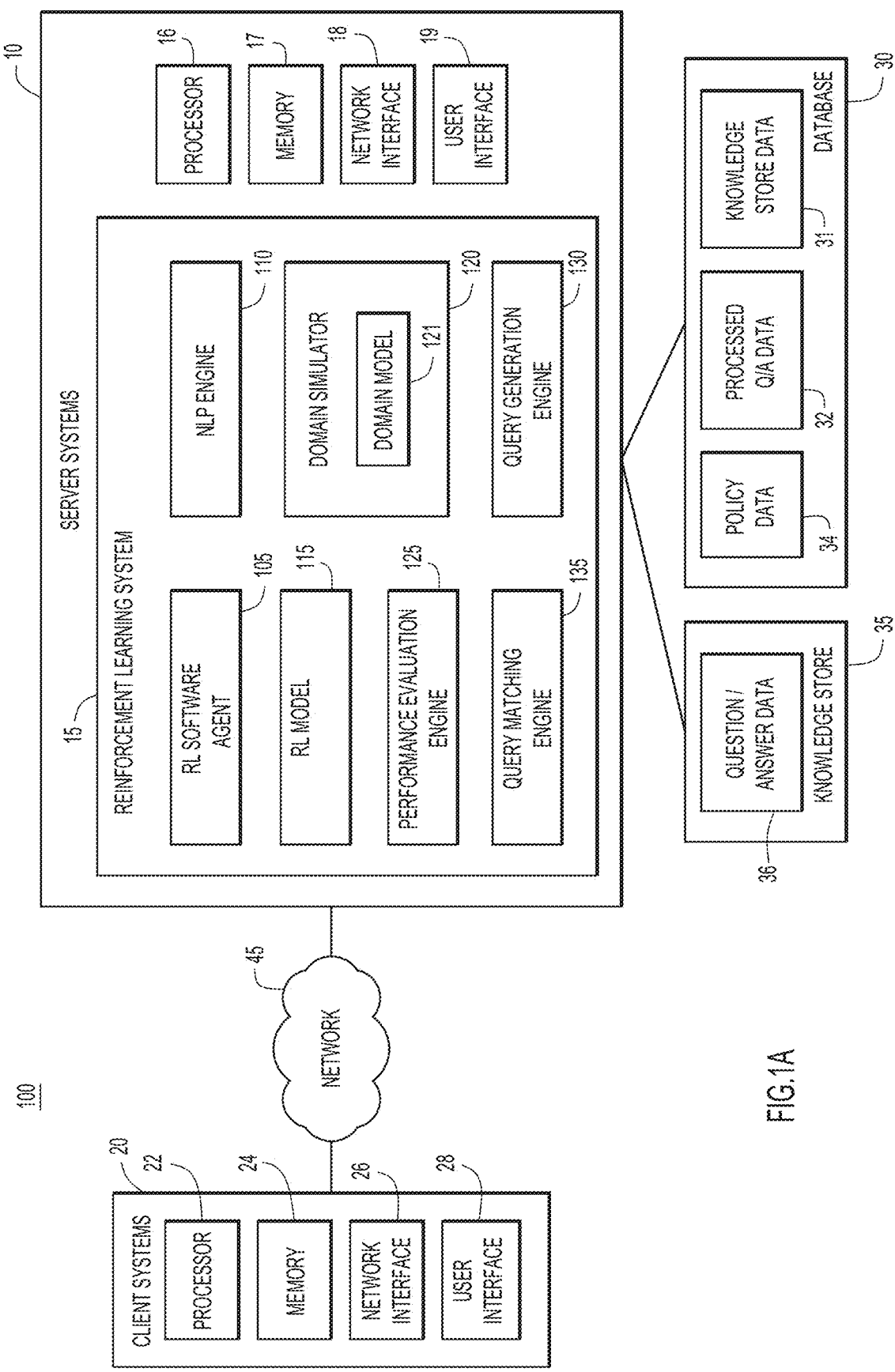
FIG. 1A is a diagrammatic illustration of an example computing environment for a reinforcement learning system according to an embodiment of the present invention.

An example environment for use with present invention embodiments is illustrated in FIG. 1. Specifically, the environment includes one or more server systems 10, one or more client or end-user systems 20, a database 30, a knowledge store 35, and network 45. Server systems 10 and client systems 20 may be remote from each other and may communicate over a network 45. The network may be implemented by any number of any suitable communications media, such as a wide area network (WAN), a local area network (LAN), Internet, Intranet, etc. Alternatively, server systems 10 and client systems 20 may be local to each other, and may communicate via any appropriate local communication medium, such as local area network (LAN), hardwire, wireless link, Intranet, etc.

Client systems 20 enable users to interact with various environments, performing activities which may generate queries that are provided to server systems 10. The server systems 10 include a RL system 15 comprising a RL software agent 105, a natural language processing (NLP) engine 110, a RL model 115, a domain simulator 120, a performance evaluation engine 125, and a query generation engine 130, as described herein.

A database 30 may store various information for the analysis, such as information obtained from knowledge store 35. For example, the RL system 15 may analyze a knowledge store located in its native environment, or may generate and store a copy of the knowledge store 35 as knowledge store 31 in database 30. The knowledge store 35 may include any suitable information in a semi-structured format, such as a question answer format, including but not limited to an online forum, a public database, a private database, or any other suitable repository. In some aspects, multiple answers may be provided to a single question. In other aspects, a question may be generated without any corresponding answer.

The information from the knowledge store 35 may be processed by the RL system 15, and stored as processed Q/A data 32. For example, processed Q/A data 32 may include information processed by NLP Engine 110 to generate data from knowledge store data 31 compatible for training the RL model 115. In aspects, this information may include mapping the question to each answer, and each answer to one or more features associated with the answer to determine relevance and quality of the answer.

Once the RL model 115 has been trained, the output of the trained RL model may be stored as policy data 34. In aspects, policy data 34 may be provided in a format compatible with decision agents, such as a (state, action) format. By matching the state of the RL software agent 105 to the state of policy data 34, the corresponding action of the policy data may be identified and provided to the RL software agent.

Database 30 may store various information for the analysis, such as knowledge store data 31 obtained from an online forum or any other knowledge base, processed Q/A data 32, and policy data 34, or any other data generated by operations involved by the RL system in a sandbox/test environment or real environment.

The database system 30 may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface, such as a GUI, etc., or other interface, such as command line prompts, menu screens, etc., to solicit information from users pertaining to performing actions in an environment, and may provide reports or other information including whether actions provided by the RL system are successful in reaching a goal.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, RL system software, browser/interface software, etc.). By way of example, the server/client includes at least one processor 16, 22 one or more memories 17, 24 and/or internal or external network interfaces or communications devices 18, 26 such as a modem or network cards, and a user interface 19, 28 etc. The optional input devices may include a keyboard, mouse, or other input device.

Alternatively, one or more client systems 20 may perform RL in a stand-alone mode of operation. For example, the client system stores or has access to the data, such as knowledge store 35 and the stand-alone unit includes RL system 15. The graphical user or other interface 19, 28, such as a GUI, command line prompts, menu screens, etc., solicits information from a corresponding user, and the state of the system may be used to generate a query.

RL system 15 may include one or more modules or units to perform the various functions of present invention embodiments described herein. The various modules (e.g., a RL software agent 105, a natural language processing (NLP) engine 110, a RL model 115, a domain simulator 120, a performance evaluation engine 125, and a query generation engine 130, etc.), may be implemented by any combination of any quantity of software and/or hardware modules or units, and may reside within memory 17 of the server for execution by processor 16. These modules are described in additional detail below. These components operate to improve the operation of the RL software agent 105 in a real environment, reducing the time needed for the RL software agent to identify and implement one or more operations (actions) to reach a goal. It is possible that multiple answers may exist, leading to different series of actions to reach a goal.

RL software agent 105 may provide decision support in a domain, as part of a RL system 15. A domain simulator, a domain model, and a knowledge store may be used to configure such a system. In some aspects, the knowledge store comprises data stored in a question and answer format corresponding to the domain. The RL software agent may be trained using reinforcement learning, wherein data from the knowledge database provides information pertaining to actions. The RL software agent may be tested in a sandbox environment, which is typically a non-production environment using the simulator, prior to deployment.

NLP engine 110 relies on NLP techniques to extract relevant portions of information from the knowledge base 35, which may be in the form of semi-structured text. NLP engine 110 is able to identify the portion of the forum corresponding to a question, one or more answers to that question, along with features associated with each answer that may be provided to the RL model 115 in order for the RL model to rank the answers for a particular question. Features may include author name, author status, upvotes, downvotes, length of response, comments to the response by other users indicating that the solution works, etc., or any combination thereof. In some cases, "upvotes" represent confidence and endorsement of answers by a community and may represent a reward signal to power a RL algorithm decision-making process.

Information retrieval techniques to crawl the contents of a knowledge store may be used to generate a copy of the knowledge store information and to store this information in database 30. Alternatively, RL system 15 may communicate with the knowledge store, to obtain relevant information pertaining to a topic (e.g., a series of answers for a particular question). The obtained information may be processed by NLP engine and stored in database 30 as processed Q/A data 32.

RL model 115 includes any suitable algorithm for ranking data associated with a set of features. For example, any suitable algorithm may be used, including but not limited to FastAP, PolyRank, Evolutionary Strategy (ES) Rank, combined regression and ranking, etc. Any suitable approach, for example, a pointwise approach, a pairwise approach, or a listwise approach may be utilized to determine an optimal ranking. Any suitable metric may be used to evaluate the rankings, including mean average precision, mean reciprocal rank, etc.

Domain simulator 120 includes a simulation environment for mimicking a real environment. Simulated environments may include sandbox environments or testbeds or any other environment which behaves in a similar manner as the real environment, but has limited connectivity to an external environment, such that actions performed in the simulated setting are not propagated to a real system. This approach provides the ability for comprehensive training and testing without potential adverse consequences from performing unsuitable actions. Typically, the domain simulator will include, or will have the ability to generate, a domain model 120, which represents the domain environment.

Performance evaluation engine 125 may comprise components for determining the performance of the RL software agent in the RL system. For example, in some aspects, the performance evaluation engine 125 may include components, such as a random decision agent and/or a planning decision agent, to represent lower and upper limits of performance. The random agent is the least efficient, as operations selected are random, and the planning agent is most efficient, as optimal actions are known. The performance of the RL system may be benchmarked against these decision agents, as well as other decision agents.

Query generation engine 130 may generate a query based on a state, which is used to identify a policy and corresponding action in response to the query.

Query matching engine 135 may match the generated query to a policy, which may be in the form of a (state, action) pair. In other aspects, the query matching engine 135 may be used to match content from the knowledge base to the generated query, which is provided to NPL engine 110 and RL model 115 for generation of a policy. These features and others are described throughout the specification and figures.

Figure 1B:
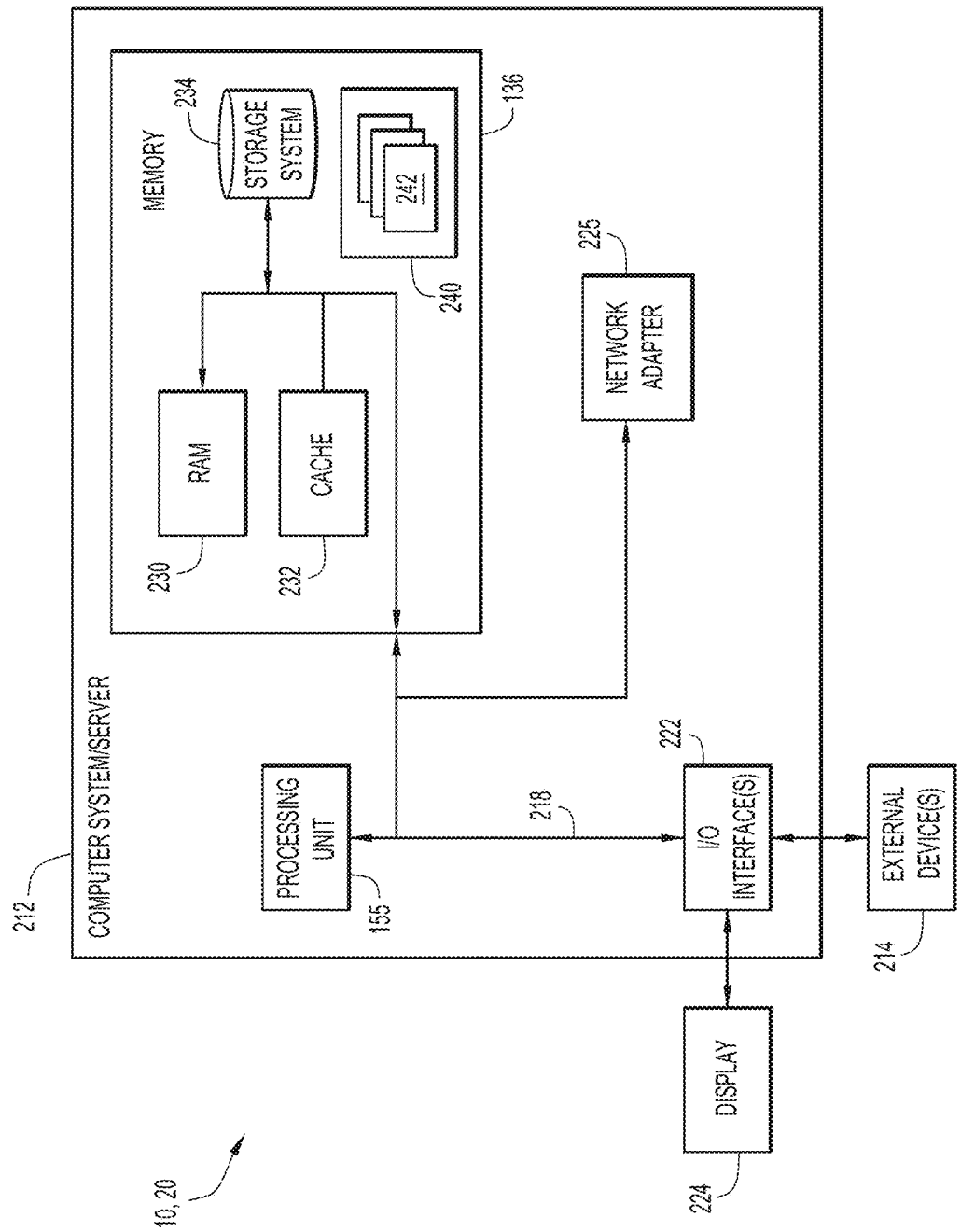
FIG. 1B is an example computing device for the computing environment of FIG. 1A, according to an embodiment of the present invention.

Client systems 20 and server systems 10 may be implemented by any suitable computing device, such as computing device 212 shown in FIG. 1B for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system which is operational with numerous other general purpose or special purpose computing system environments or configurations. Examples of well-known computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., RL system 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 155, a system memory 136, and a bus 218 that couples various system components including system memory 136 to processor 155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., RL system 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 2:
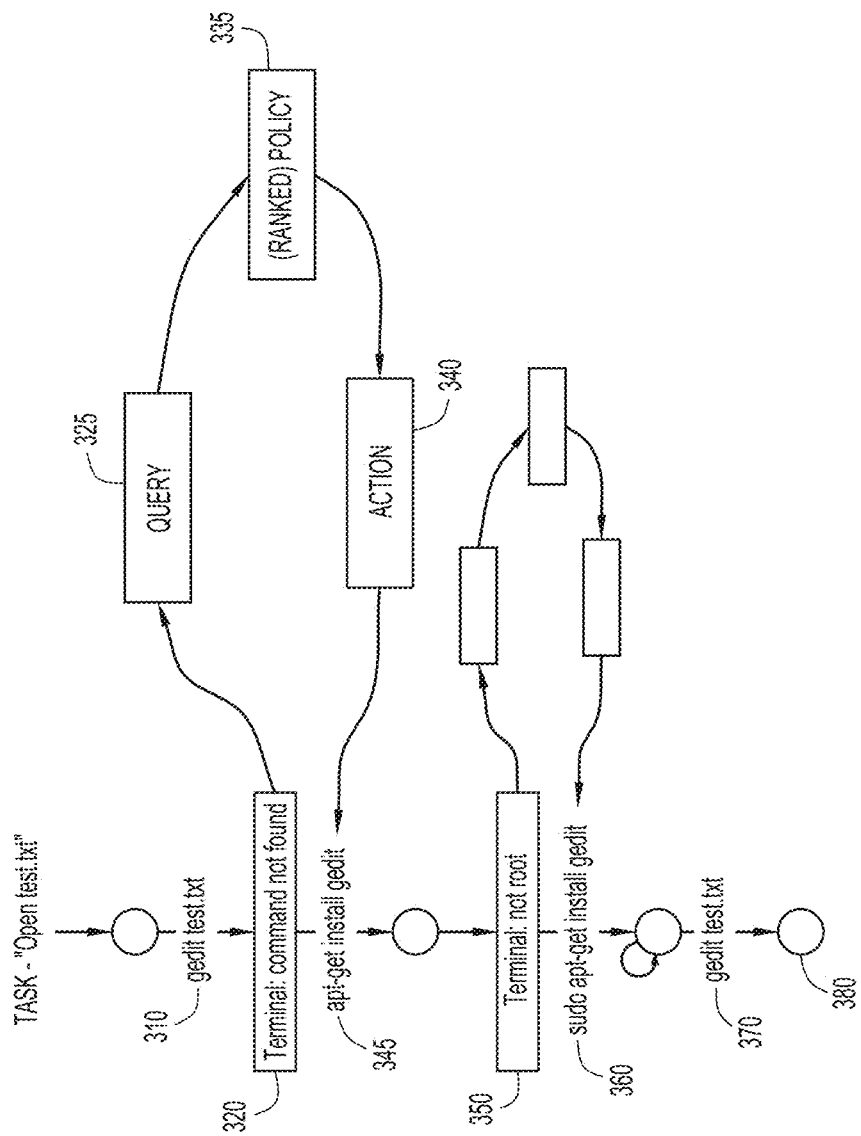
FIG. 2 is a flowchart showing example computing commands and operations for a deployed reinforcement learning software agent in a reinforcement learning system, according to an embodiment of the present invention.

FIG. 2 is a flowchart showing example computing commands and operations for a deployed RL software agent in a RL system, according to an embodiment of the present invention.

The following example shows how a task such as opening a text document can be supported by a RL software agent (RL decision agent) and RL model. At operation 310, a user enters a command to open a document with gedit. At operation 320, the computing environment determines that the command gedit is not found. In response, at operation 325, a query is generated, e.g., by query generation engine 130 of the RL software system. The query is used to identify relevant content from a knowledge store, e.g., using a query matching engine 135, wherein the content may be in the form of a policy or in a semi-structured form representing information stored in the knowledge store. In some cases, an exact match for the query may not be found. In this case, a result may be returned based on similarity of the query to content in the knowledge store.

In this example, the matched or similar content may be processed by the NLP engine 110 and RL model 115 in response to query matching. However, in other aspects, knowledge store information may be stored and/or processed at a predetermined time interval to generate a ranked policy stored in database 30 (see, e.g., for this embodiment, FIGS. 6A-6B). Either approach is suitable for the embodiments provided herein.

Once the query is matched to content in the knowledge store (e.g., question answer pairs), NLP engine 110 and RL model 115 are configured to generate a policy based on this content and to rank the (state, action) pairs of the policy (e.g., based on upvotes, author name, author status, replies, etc.) present within the forum. At operation 335, the RL system identifies the highest ranked (question, answer) pair, wherein the question corresponds to a state and the answer corresponds to an action executable by the RL software agent.

At operation 340, an action corresponding to the matched state of the policy, is provided back to the RL software agent. At operation 345, the computing environment executes the action, in this case, apt-get install gedit. At operation 350, another error is generated, which leads to another query being generated. In this case, the system determines that it does not have permission to install gedit. Operations 325-340 are repeated to provide a corresponding action to the RL software agent.

The computing environment assumes root permission, and installs gedit at operation 360. At operation 370, the original command is executed, thereby opening the test file. At operation 380, the support by the RL software agent and RL model ends for this particular task.

Figure 3A:
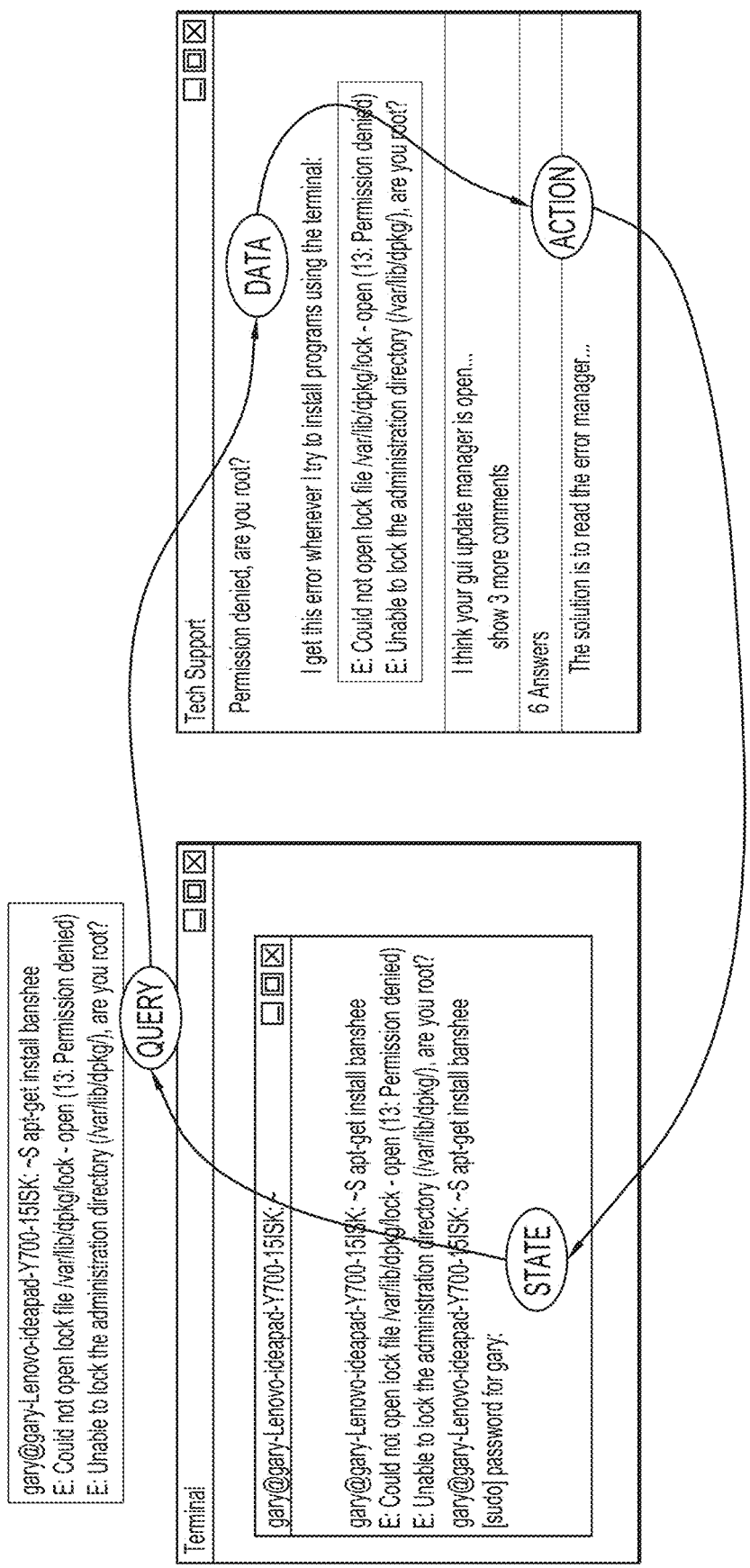

FIGS. 3A-3B are illustrations showing example environments for a deployed RL software agent in specific domains, according to embodiments of the present invention. Knowledge databases, such as online forums, contain information that may be used to improve the performance of RL software agents. For example, online forums may contain question and answer support forums, the contents of which may be ranked by various parameters, such as relevance, date, upvoting/popularity, author status, etc. within that domain. This information may be mined by a RL model to identify optimal answers to questions (or actions to states).

FIG. 3A corresponds to a computing environment. FIG. 3B corresponds to a travel environment. In each instance, the user performs an action that generates a specific state. For example, the user may execute a command that requires access to a specific software platform, or may submit a query to an online website that utilizes decision agents for support.

According to present techniques, a query is derived from the state of the user and is used to identify a policy corresponding to that state. A ranked (state, action) pair of the policy is selected, which is derived based on data from the knowledge store that has been processed by the RL model. Accordingly, the (state, action) pairs, generated by the RL system 15, determine the appropriate action, leading to the next state. Thus, the question and answer correspondence represents an implicit state transition suggesting the correct action/policy in a given state.

The knowledge store or forums contain information (e.g., structured, unstructured, semi-structured) from subject matter experts who have solved the same or a similar problem.

Forums provide pseudo traces that can be used to bootstrap the learning process of an RL agent. The bootstrapping happens using the techniques provided herein, which may be used to train cognitive systems for decision support in various domains, e.g. technical support for software, support for travel sites, etc.

Online forums are available for assistance with programming (e.g., Java, Python, C++ etc.), as well as operating systems (Windows, Linux, Mac), etc. This approach may be used to capture and use group data or individual data from a forum.

These techniques may also be used to adapt actions to specific user preferences. In some cases, a combination of features can be used to adapt actions that are specific to a given user's preferences.

Figure 4:
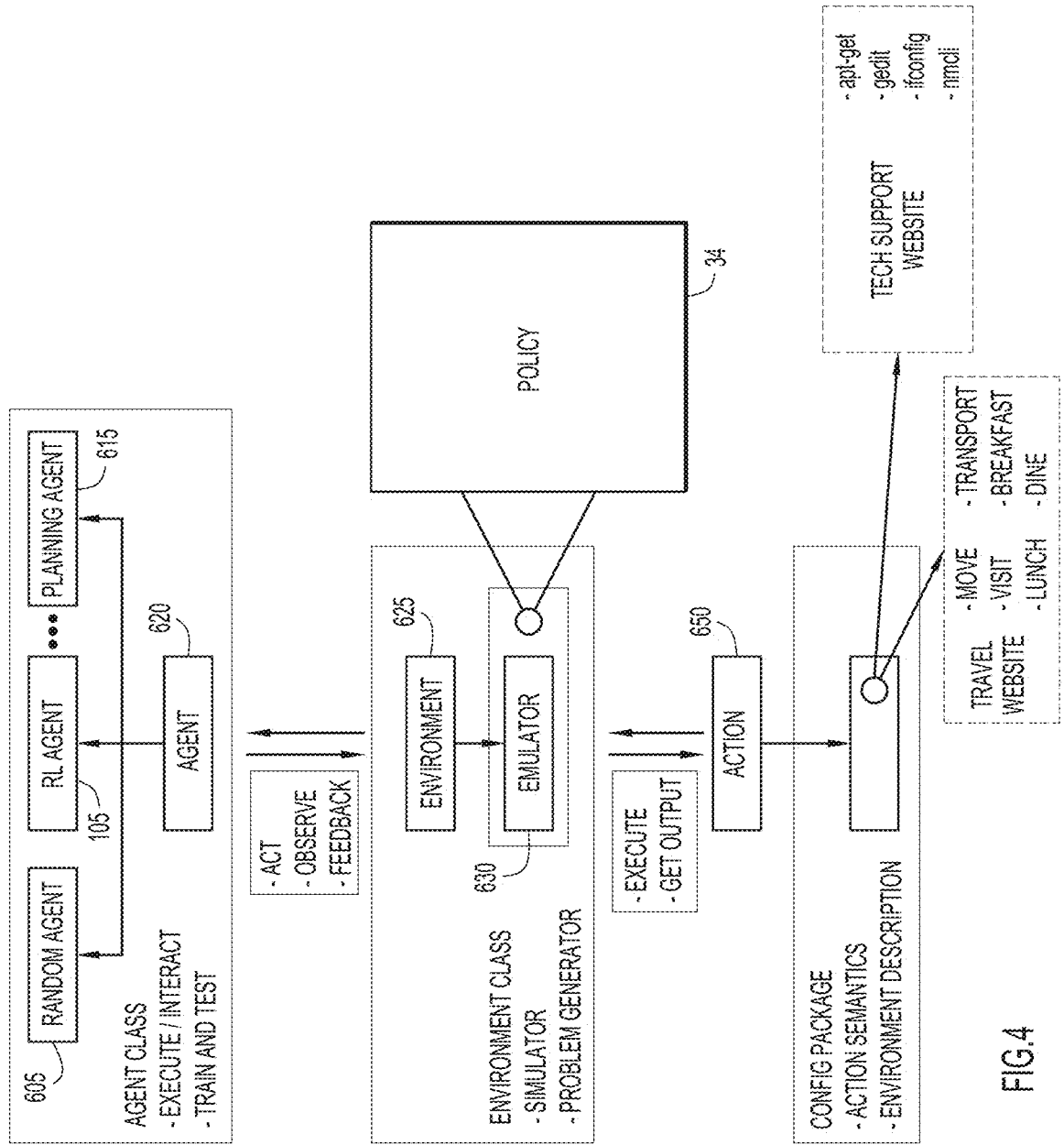
FIG. 4 is a flowchart showing a sandbox environment for testing the reinforcement learning software agent, according to an embodiment of the present invention.

FIG. 4 provides a test or sandbox environment for embodiments of the present techniques. This architecture represents a generic implementation for agent and environment classes. In some aspects, plug and play agents may be utilized allowing different types of technologies (e.g., programming, operating systems, traveling, scientific literature, etc.) to be evaluated for benchmarking.

In general, agent 620 may comprise one or more types of agents. Random agent 605, may perform actions randomly until achieving its goals. This agent may be used to establish a lower bound for assessing performance by the learning agent, as actions are performed at random. As the number of next states increases due to complexity of the system, the performance of the random engine deteriorates.

Planning agent 615, which is a state-based agent, may be used to generate an optimal approach or plan for reaching a goal (e.g., through a series of states changes), based on its current state. The domain may be manually coded, or learned using computational techniques such as execution traces. This type of agent executes a plan to achieve a goal and represents an optimal efficiency.

RL agent 105, which learns through reinforcement learning, may learn policies (state, action) pairs ranked by a RL system that map a (state, action) pair to a value that signifies the usefulness of performing the action in the current state. RL agents may include data-driven agents, Q-learning agents, etc. The RL model may generate policies, which determine the next state of the RL agent 105, based on the current state of the RL agent.

Agents 620 may be provided as part of a package along with a domain simulator 120, which may comprise test environment 625 and emulator 630. The emulator 630 may be deployed in the test environment 625 (e.g., a sandbox) to allow testing without being deployed in a real system. The sandbox environment allows both learning and benchmarking/performance.

The emulator may be used to emulate the domain environment using an underlying domain model 120. In aspects, the system may learn the domain model automatically. For example, the system may learn a domain model in computing environments based on help pages. Alternatively, models of the environment may be established based on questions from a forum, e.g., to identify actions that a user may perform. The emulator 630 may perform actions 650, and the results stored, e.g., in database 30.

During training, a query may be formulated by the RL software agent 105. The RL software system identifies a policy generated by a RL model, wherein the state corresponds or is similar to the state of the RL software agent. Once a match between the current state and policy state is performed, a correcting action may be selected, and the action performed in the sandbox. If the action resolves the query, a reward is received (e.g., successfully resolving a user computing issue such as opening a file). On the other hand, if the action fails, the RL software agent will learn that the selected action did not resolve the issue, and will not select this action for the corresponding state in the future.

Thus, the emulator 630 receives policy information 34 generated and ranked by a RL model 115 that has processed the knowledge base data to generate a series of (state, action) pairs. An associated Q-value may be assigned to each pair of the policy, and the RL software agent, when deployed, will pick the highest Q-value, to efficiently reach its goal.

Once trained and tested in the sandbox, the RL software agent may be deployed along with the RL model, which contains ranked knowledge based data represented as (state, action) pairs.

Figure 5:
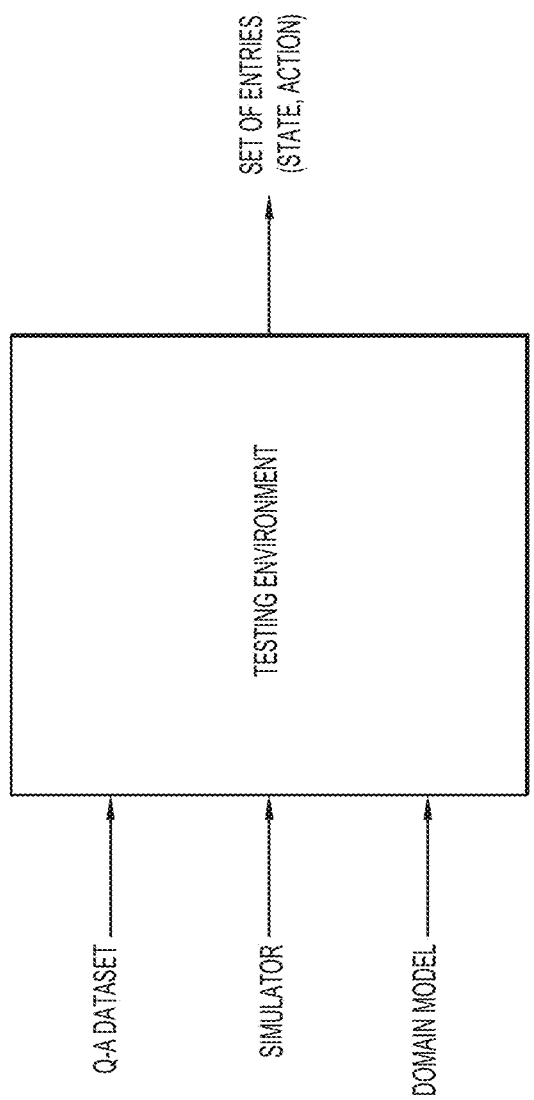
FIG. 5 is a diagrammatic illustration of inputs and outputs of the testing environment, according to an embodiment of the present invention.

FIG. 5 shows inputs and outputs to the sandbox environment. This approach may be used for any system in which a question answer (Q/A) dataset, a simulator for the environment, and a domain model is available. Present embodiments include any suitable type of automated model-learning for decision support (and execution). This allows decision support agents to be booted up and trained in situ, as hand-coding a decision agent manually for a large system with high complexity is not practical. The ability to learn a domain model automatically mitigates this complexity.

The Q-A dataset, typically comprises a set of entries with each entry having a question and zero or more answers. The answers may be structured, semi-structured or unstructured. Each answer may contain sets of actions and features/parameters, pertaining to a question, extracted by the RL system 15. Features may include author name, author status, upvotes, downvotes, length of response, comments to the response by other users indicating that the solution works, etc., or any combination thereof. In general, a feature contains information that may be used to assess the quality (e.g., efficiency, effectiveness, etc.) of the answer to a question and may act as a reward signal to a RL system. For example, in some cases, "upvotes" represent confidence and endorsement of answers by a community and may represent a reward signal to power a RL algorithm decision-making process.

The RL model may be trained based on these features to efficiently determine a series of actions leading to a desired goal or solution. By training the RL model on data that has been at least lightly curated by a plurality of users, the trained and tested RL model may enable the RL software agent to reach a desired goal more quickly and efficiently than a RL software agent without the RL model. Rather than selecting random or seemingly random actions, and determining whether a reward signal is received, the RL system may be trained on information in a knowledge store.

Figure 6A:
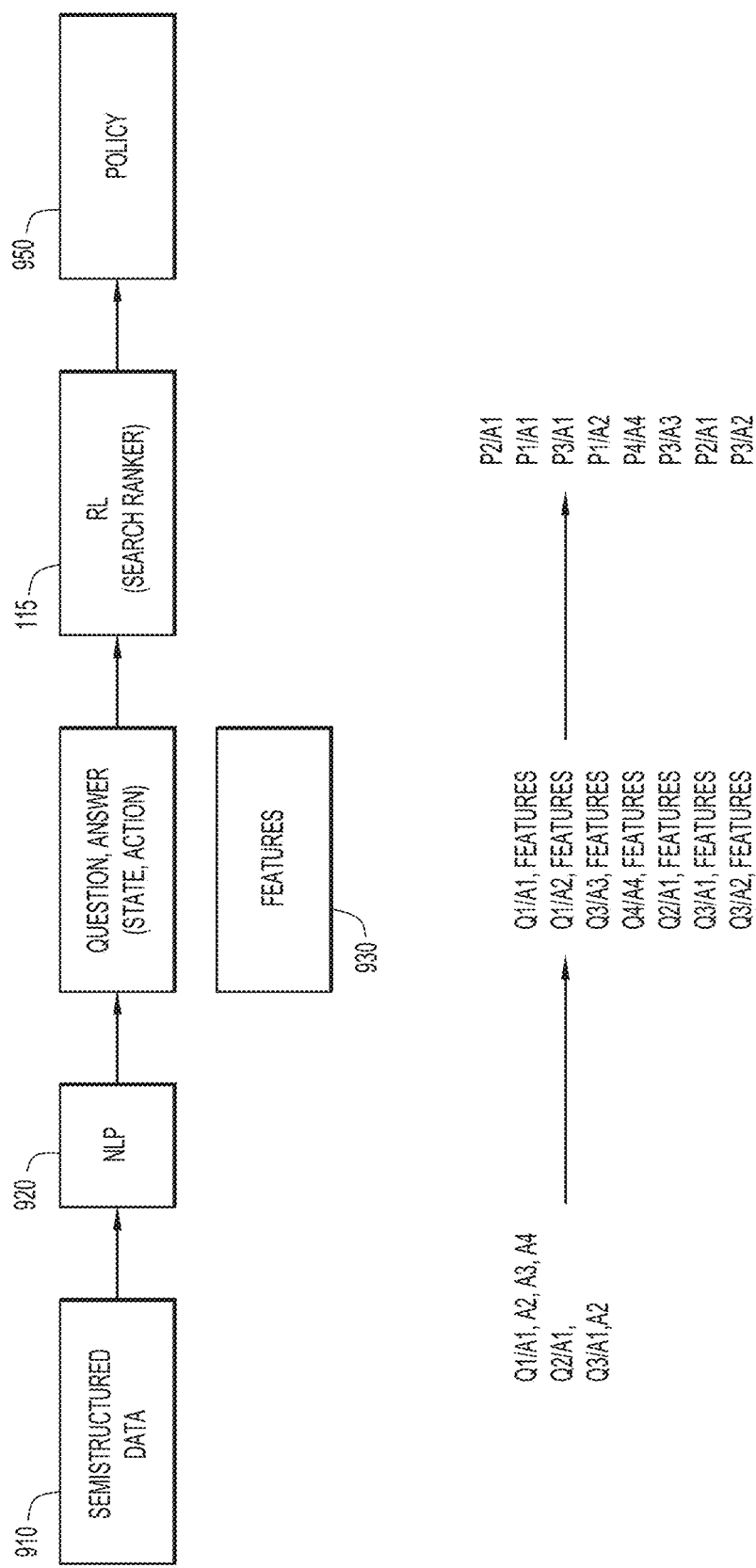
FIG. 6A is a flowchart showing ranking of knowledge base data by a reinforcement learning system, according to an embodiment of the present invention.

FIG. 6A is a flowchart showing ranking of knowledge base data by a RL model 115, according to an embodiment of the present invention. Semi-structured data 910 is provided to NLP 920, to extract forum information, e.g., in the form of a question and a corresponding answer. Semi-structured data may comprise questions (Q1, Q2, Q3 . . . ), with each question having one or more answers (e.g., A1, A2, A3, . . . ). For each answer, corresponding feature information 930 is extracted. In some aspects, a one-to-one mapping map be performed between the question and each answer along with corresponding features for that answer. Any other suitable form of information may be used. This information is provided to RL model 115. The RL model ranks each answer based on the provided features, and generates a policy 950, which may be in the form of a ranked list or any other suitable form. When a query is generated by the RL software agent, a state is matched for the policy, and the corresponding action is provided to the RL software agent for execution.

In other aspects, RL techniques may be combined with heuristic techniques to rank (state, action) pairs of a policy.

Figure 6B:
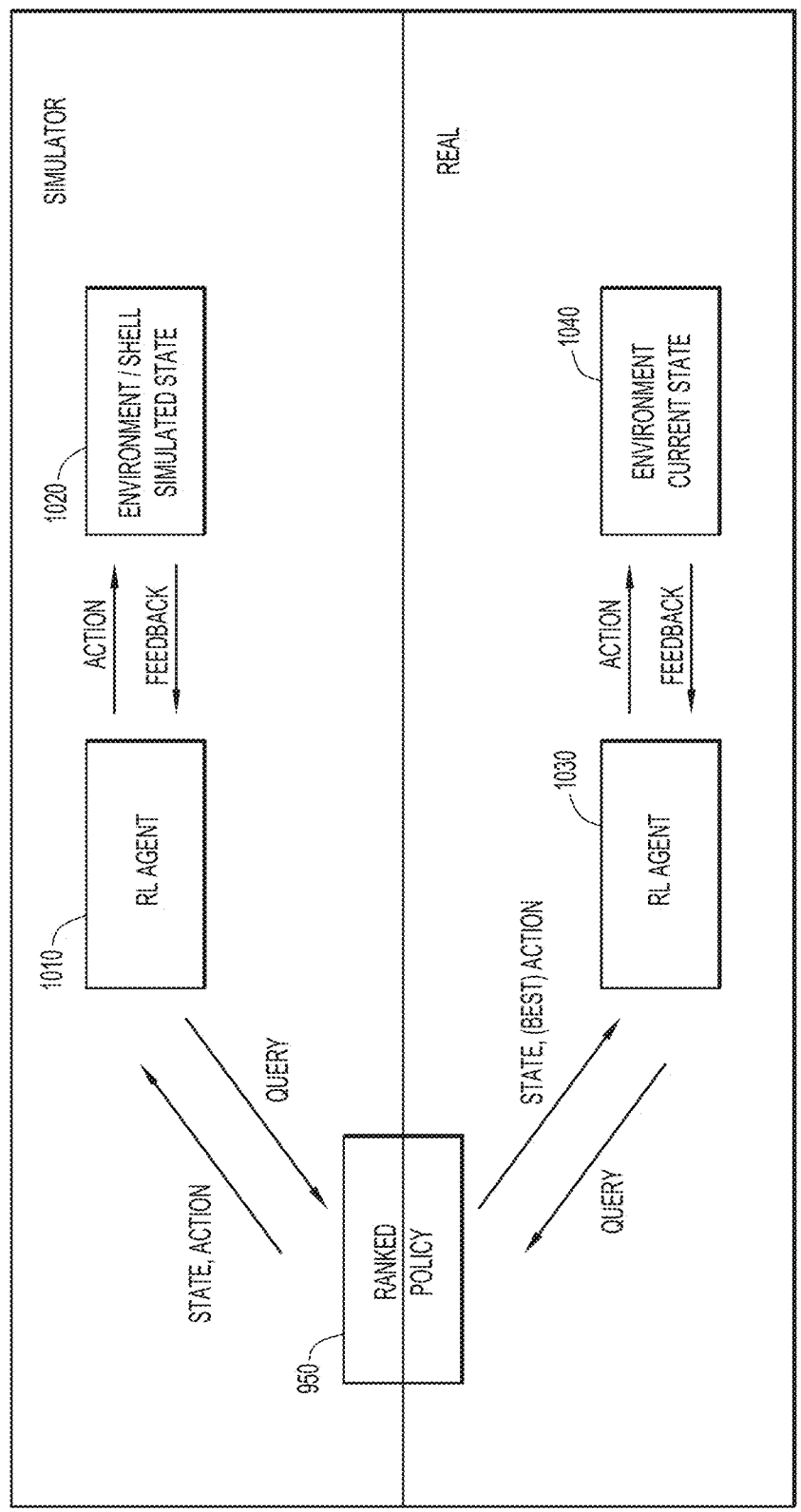
FIG. 6B is a flowchart showing utilization of policy information from FIG. 6A developed in a sandbox environment for deployment in a reinforcement learning system, according to an embodiment of the present invention.

FIG. 6B is a flowchart showing utilization of policy information 950 from FIG. 6A developed in a sandbox environment for deployment in a RL system, according to an embodiment of the present invention. The upper portion of the figures corresponds to training in the sandbox environment. RL agent 1010 is operating in the sandbox environment, interacting with an environment shell 1020. When a query is generated, a policy match occurs based on state of the RL agent. A corresponding action to the policy is provided to the RL software agent, which executes the action. By executing the action in the environment shell, the state of the RL software agent changes, and feedback is provided to the RL software agent regarding the action. For example, if the action results in reaching a goal, the action may be validated or a reward provided to reinforce the behavior.

In the real environment, in response to query generation, the RL system may match the state of the RL software agent to a state in policy 950 generated by the RL model. The best action (highest ranked) is returned for the RL software agent 1030 to execute.

In this example, NLP engine and RL model process the knowledge base data prior to query generation, and store the ranked policy in a database.

Figure 7A:
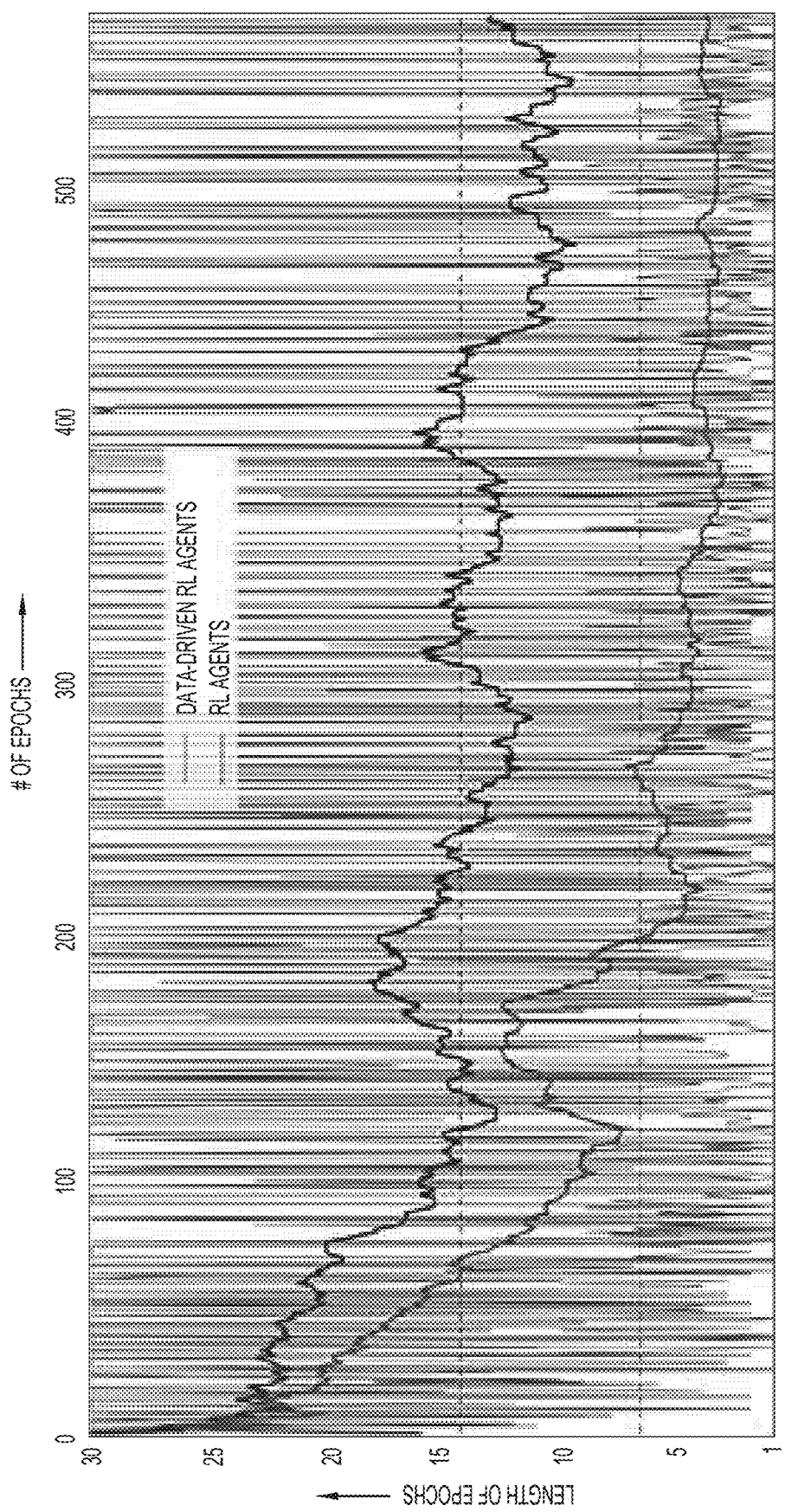
FIGS. 7A and 7B show examples of evaluating performance of the reinforcement learning system, according to an embodiment of the present invention.
Figure 7B:
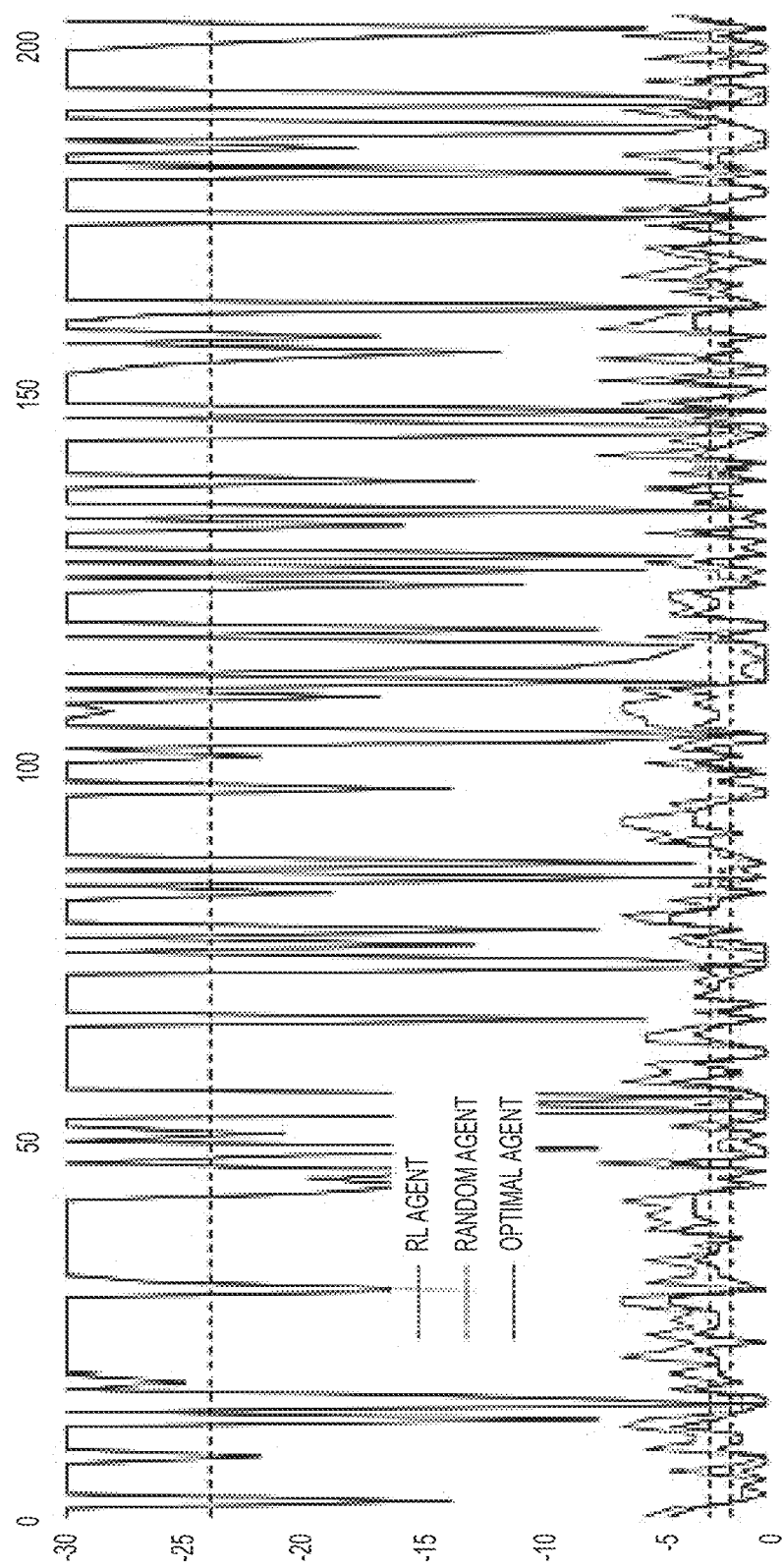

FIGS. 7A-7B show example results of benchmarking and performance evaluation in the sandbox environment. Sandboxes provide an environment for RL model training apart from a production-based or real environment. Typically, RL model training occurs in the sandbox, while testing is performed in a real environment. A curated domain, including a random decision agent and an optimal planning agent may be used to benchmark performance and learning rates for the RL software agent.

FIG. 7A shows a plot of the number of epochs versus length of epochs. For FIG. 7A, the RL software agent (without a corresponding RL model) initially had a sharp decline in epoch length, which translated to an increase in learning. This trajectory leveled off and did not appear to converge to an optimal trajectory (e.g., such as from a planning agent). In contrast, the RL software agent (with a corresponding RL model) showed a similar sharp decline in epoch length and this trajectory continued to decrease until approaching an optimal trajectory.

FIG. 7B shows a variety of agents, a random agent (e.g., strawman), an optimal agent (e.g., planning agent), and a RL software agent. The random agent, based on pure self-exploration in real world domains did not converge fast enough (or at all), as expected with high fan outs. In contrast, the RL software agent, augmented with the RL model trained on knowledge bases, had a similar performance as the optimal agent. Thus, the RL software agent that was augmented with external data that provided guidance, reached convergence or near convergence to an optimal trajectory.

Figure 8:
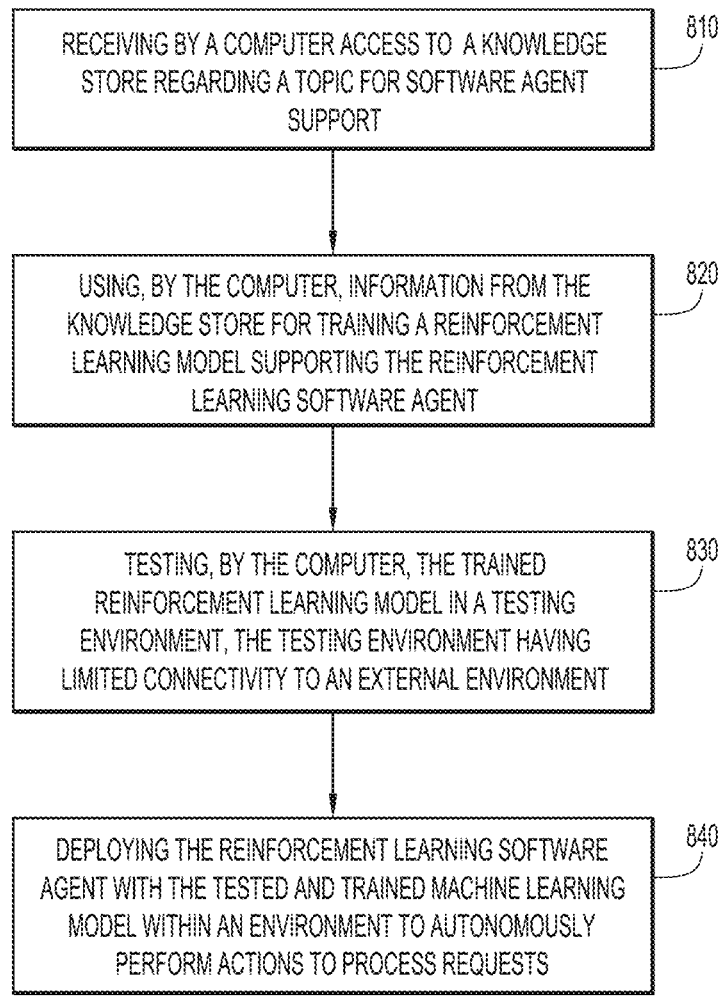
FIG. 8 shows a high level flowchart of operations for implementing a reinforcement learning system, according to an embodiment of the present invention.

FIG. 8 is an operational flow chart showing high level operations of the techniques provided herein. At operation 810, a computer receives access to a knowledge base regarding a topic for RL software agent support. At operation 820, the computer uses information from the knowledge base for training a RL model supporting the RL software agent. At operation 830, the computer tests the trained RL model in a testing environment, the testing environment having limited connectivity to an external environment. At operation 840, the RL software agent is deployed with the tested and trained RL model within an environment to autonomously perform actions to process requests.

Thus, in aspects, the RL software agent generates a query based on its current state. The RL system matches the query to a (state, action) pair of a policy, wherein the policy is generated by a RL model based on information obtained from a knowledge base. The RL model, in combination with other techniques, such as NPL, may process semi-structured information, e.g., to identify the best action based on a plurality of answers. The RL software agent executes the action to reach the next state. This process may continue, until reaching the goal.

Present techniques improve the operation of RL software agents, as the training time of the RL software agents may be reduced due to input from the RL model. Traditionally, training a RL software agent involves an iterative, computationally intensive process that may not converge to a goal in a complex environment.

Further, the RL software agents are configured to operate in dynamic environments, wherein performing actions leads to state changes. Present techniques provide the ability to train a RL software agent in a dynamic, complex test environment, and to deploy the RL software agent and trained and tested RL model in a real system.

Features of present invention embodiments include using knowledge databases to augment and improve RL software agents. RL software agents may be developed in an automated manner, based on techniques using domain learning. Performance of the decision support agent, which utilizes reinforcement learning, may be compared to performance of an optimal planner for benchmarking.

Benefits of these techniques provide for immediate, scalable, and personalized on-site support. Further, by using decision agents to handle technical support issues, technical support experts are made available to solve more advanced support issues.

These techniques may be applied to a wide variety of environments. Any environment in which a simulator and training data are available are suitable for use with present invention embodiments. Decision support agents may be used to assist with decisions in implementing and configuring software on operating systems, with implementing and configuring networks using network simulators, with troubleshooting programming techniques based on information in online programming forums, with health-related decisions based on scientific and medical literature, etc.

Present techniques offer a novel, low-effort approach to building a support tool that learns continuously from feedback and past data. This approach may be used to scale decision support technologies in enterprise and public settings in an efficient and timely manner.

Further, present techniques capture implicit preferences of a community of users, while offering continuous life-long learning for an RL software agent and RL model.

It will be appreciated that the embodiments described above and illustrated in the drawings represent only a few of the many ways of implementing embodiments for RL software systems.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, RL system 15, etc.). These systems may include any type of monitors and input devices (e.g., keyboard, mouse, voice recognition, etc.) to enter and/or view information.

It is to be understood that the software (e.g., RL system 15, including RL software agent 105, NLP engine 110, RL model 115, domain simulator 120, performance evaluation engine 125, query generation engine 130, query matching engine 135, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., RL system 15, including RL software agent 105, NLP engine 110, RL model 115, domain simulator 120, performance evaluation engine 125, query generation engine 130, query matching engine 135, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., RL system 15, including RL software agent 105, NLP engine 110, RL model 115, domain simulator 120, performance evaluation engine 125, query generation engine 130, query matching engine 135, etc.). The database system may be implemented by any number of any conventional or other databases, data stores or storage structures (e.g., files, databases, data structures, data or other repositories, etc.) to store information (e.g., knowledge store data 31, processed Q/A data 32, policy data 34 etc.). The database system may be included within or coupled to the server and/or client systems. The database systems and/or storage structures may be remote from or local to the computer or other processing systems, and may store any desired data (e.g., knowledge store data 31, processed Q/A data 32, policy data 34, etc.).

The present invention embodiments may employ any number of any type of user interface (e.g., Graphical User Interface (GUI), command-line, prompt, etc.) for obtaining or providing information (e.g., knowledge store data 31, processed Q/A data 32, policy data 34, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the RL 15 may include any information arranged in any fashion, and may be configurable based on rules or other criteria to provide desired information to a user (e.g., one or more actions, etc.).

The present invention embodiments are not limited to the specific tasks or algorithms described above, but may be utilized for any application using RL software agents to support complex tasks. Further, this approach may be generally applicable to providing support in any context, and is not limited to any particular application domain, such as manufacturing, health, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of using data from a knowledge store to configure a reinforcement learning software agent, the method comprising:
receiving, by a computer, access to the knowledge store regarding a topic for software agent support, wherein the knowledge store includes information for the topic from subject matter experts;
using, by the computer, the information from the knowledge store for training a reinforcement learning model supporting the reinforcement learning software agent;
testing, by the computer, the trained reinforcement learning model in a testing environment, the testing environment including a domain simulator to emulate a domain and not propagating performed actions in the testing environment to a production based environment;
validating learned actions by the reinforcement learning software agent in the testing environment using a planning decision agent and a random software agent, wherein the planning decision agent produces known optimal actions and represents an upper limit of performance and the random software agent produces random actions and represents a lower limit of performance; and
deploying the reinforcement learning software agent with the tested and trained reinforcement learning model within the production based environment and autonomously performing actions to process requests, wherein autonomously performing actions to process requests includes:
generating a content query to obtain content from the knowledge store pertaining to a request to perform a command, wherein the content from the knowledge store includes questions with one or more corresponding answers pertaining to the command from a forum;
generating by the reinforcement learning model a policy for processing the command including states and corresponding actions based on the content from the knowledge store, wherein the states correspond to the questions of the content and the actions correspond to the corresponding answers of the content indicating actions executable by the reinforcement learning agent for performing the command, and wherein the policy ranks the states and actions based on attributes from the forum;
generating a policy query based on a state associated with a user and matching the policy query to a state in the policy with a corresponding action; and
executing by the reinforcement learning software agent the corresponding action from the policy to perform the command.

2. The method of claim 1, wherein the information from the knowledge store is in a semi-structured format.

3. The method of claim 2, wherein the knowledge store comprises information generated by a plurality of users, and wherein at least part of the generated information is curated by the plurality of users.

4. The method of claim 1, wherein the knowledge store includes features that are used by the reinforcement learning model to rank the information provided in the knowledge store.

5. The method of claim 4, wherein the features include one or more from a group of upvotes, downvotes, an author name, an author title, and an author status.

6. The method of claim 1, wherein the reinforcement learning model ranks the information in the knowledge store based on user preferences.

7. The method of claim 1, further comprising:
receiving a reward based on executing the corresponding action by the reinforcement learning software agent, when the corresponding action resolves the policy query.

8. The method of claim 1, further comprising:
updating the policy generated by the reinforcement learning model, at a fixed or dynamic frequency, to include questions and answers added to the knowledge store.

9. The method of claim 1, wherein the reinforcement learning software agent deployed with the trained reinforcement learning model reaches a desired goal more efficiently than a reinforcement learning software agent without a trained reinforcement learning model.

10. A computer system for using data from a knowledge store to configure a reinforcement learning software agent, the computer system comprising:
one or more computer processors;
one or more computer readable storage media;
program instructions stored on the one or more computer readable storage media for execution by at least one of the one or more computer processors, the program instructions comprising instructions to:
receive access to the knowledge store regarding a topic for software agent support, wherein the knowledge store includes information for the topic from subject matter experts;
use the information from the knowledge store to train a reinforcement learning model supporting the reinforcement learning software agent;
test the trained reinforcement learning model in a testing environment, the testing environment including a domain simulator to emulate a domain and not propagating performed actions in the testing environment to a production based environment;
validate learned actions by the reinforcement learning software agent in the testing environment using a planning decision agent and a random software agent, wherein the planning decision agent produces known optimal actions and represents an upper limit of performance and the random software agent produces random actions and represents a lower limit of performance; and
deploy the reinforcement learning software agent with the tested and trained reinforcement learning model within the production based environment and autonomously perform actions to process requests, wherein autonomously performing actions to process requests includes:
generating a content query to obtain content from the knowledge store pertaining to a request to perform a command, wherein the content from the knowledge store includes questions with one or more corresponding answers pertaining to the command from a forum;

generating by the reinforcement learning model a policy for processing the command including states and corresponding actions based on the content from the knowledge store, wherein the states correspond to the questions of the content and the actions correspond to the corresponding answers of the content indicating actions executable by the reinforcement learning agent for performing the command, and wherein the policy ranks the states and actions based on attributes from the forum;

generating a policy query based on a state associated with a user and matching the policy query to a state in the policy with a corresponding action; and executing by the reinforcement learning software agent the corresponding action from the policy to perform the command.

11. The computer system of claim 10, wherein the information from the knowledge store is in a semi-structured format.

12. The computer system of claim 11, wherein the knowledge store comprises information generated by a plurality of users, and wherein at least part of the generated information is curated by the plurality of users.

13. The computer system of claim 10, wherein the knowledge store includes features that are used by the reinforcement learning model to rank the information provided in the knowledge store, wherein the features include one or more from a group of upvotes, downvotes, an author name, an author title, and an author status.

14. The computer system of claim 10, wherein the program instructions further comprise instructions to:

receive a reward based on executing the corresponding action by the reinforcement learning software agent, when the corresponding action resolves the policy query.

15. The computer system of claim 10, wherein the reinforcement learning software agent deployed with the trained reinforcement learning model reaches a desired goal more efficiently than a reinforcement learning software agent without a trained reinforcement learning model.

16. A computer program product for using data from a knowledge store to configure a reinforcement learning software agent, the computer program product comprising one or more computer readable storage media collectively having program instructions embodied therewith, the program instructions executable by a computer to cause the computer to:

receive access to the knowledge store regarding a topic for software agent support, wherein the knowledge store includes information for the topic from subject matter experts;

use the information from the knowledge store to train a reinforcement learning model supporting the reinforcement learning software agent;

test the trained reinforcement learning model in a testing environment, the testing environment including a domain simulator to emulate a domain and not propagating performed actions in the testing environment to a production based environment;

validate learned actions by the reinforcement learning software agent in the testing environment using a planning decision agent and a random software agent, wherein the planning decision agent produces known optimal actions and represents an upper limit of performance and the random software agent produces random actions and represents a lower limit of performance; and deploy the reinforcement learning software agent with the tested and trained reinforcement learning model within the production based environment and autonomously perform actions to process requests, wherein autonomously performing actions to process requests includes:

generating a content query to obtain content from the knowledge store pertaining to a request to perform a command, wherein the content from the knowledge store includes questions with one or more corresponding answers pertaining to the command from a forum;

generating by the reinforcement learning model a policy for processing the command including states and corresponding actions based on the content from the knowledge store, wherein the states correspond to the questions of the content and the actions correspond to the corresponding answers of the content indicating actions executable by the reinforcement learning agent for performing the command, and wherein the policy ranks the states and actions based on attributes from the forum;

generating a policy query based on a state associated with a user and matching the policy query to a state in the policy with a corresponding action; and executing by the reinforcement learning software agent the corresponding action from the policy to perform the command.

17. The computer program product of claim 16, wherein the information from the knowledge store is in a semi-structured format.

18. The computer program product of claim 17, wherein the knowledge store comprises information generated by a plurality of users, and wherein at least part of the generated information is curated by the plurality of users.

19. The computer program product of claim 16, wherein the program instructions further comprise instructions to:

receive a reward based on executing the corresponding action by the reinforcement learning software agent, when the corresponding action resolves the policy query.

20. The computer program product of claim 16, wherein the reinforcement learning software agent deployed with the trained reinforcement learning model reaches a desired goal more efficiently than a reinforcement learning software agent without a trained reinforcement learning model.

* * * * *